United States Patent [19]
Pollitt

[11] 4,357,119
[45] Nov. 2, 1982

[54] FURNITURE FITTING

[75] Inventor: Thomas B. Pollitt, Southport, England

[73] Assignee: Newage Kitchens Limited, Liverpool, England

[21] Appl. No.: 151,928

[22] Filed: May 21, 1980

[30] Foreign Application Priority Data

May 22, 1979 [GB] United Kingdom ............... 7917720

[51] Int. Cl.$^3$ ............................................. B25G 3/00
[52] U.S. Cl. ................................... 403/231; 403/407; 403/245
[58] Field of Search ................ 403/231, 403, 407, 245

[56] References Cited

U.S. PATENT DOCUMENTS 3,347,574 10/1967 Strubin ............................... 403/407
4,127,353 11/1978 Busse ................................. 403/407 X
4,236,848 12/1980 Rock et al. .......................... 403/231

Primary Examiner—Andrew V. Kundrat
Attorney, Agent, or Firm—Gipple & Hale

[57] ABSTRACT

The invention relates to a fitting comprising a male component and a female component respectively to be attached to furniture wall parts to be joined together normal to one another. The former comprises a male member and a shank bearing circumferential ribs to hold the shank in a hole bored in one of the furniture parts, and the latter is in the form a part cylindrical body likewise ribbed to hold the body in a hole bored in the other furniture part. The body constitutes a socket formed to interrupt the lateral wall of the body so that the socket opens radially of the body; the hole formed in the respective furniture part being of complementary form to interrupt an end edge of the furniture part. The male member further comprises a recess in part delineated by a ledge and tapered end faces of flanges of the male member; and the female component further comprises a resilient tongue. With the components secured to their respective furniture parts, the male member is then axially entered into the socket but so that it connects with its shank radially of the socket via the radial opening of the socket and the interrupted end edge of respective furniture part. This leaves the recess accessible from the exterior of the fitting so that by insertion of a suitable tool e.g. a screwdriver blade, the tongue can be dislodged from the recess of the male member to permit disengagement of the two fitting parts.

17 Claims, 10 Drawing Figures

FURNITURE FITTING

DESCRIPTION

The present invention relates to a furniture fitting of two interlockable components for releasably securing together respective parts of a piece of furniture required to be held at a predetermined angular position in relation to one another, such as adjacent walls of a cabinet or cupboard or the upright and a shelf of a shelf unit.

Such a fitting ideally has quite exacting requirements to meet. Thus, it must secure the two furniture parts together firmly and with minimal play notwithstanding that it must also allow the fitting components then to be released from one another when required, it must be simple to manufacture, easy to fit to the furniture parts, and, when fitted, be unobtrusive and permit easy assembly of the furniture parts.

It is an object of the present invention to provide such a fitting.

In an embodiment of the invention, the fitting comprises a female component comprising a socket and adapted to be let into a furniture part so that no portion of the component projects substantially from any of the surfaces of the furniture part and so that the socket is accessible from a surface thereof, and a male component having a male member and means adapted to be let into the other of the furniture parts to secure the male component to that part with the male member projecting from a surface thereof; the socket of the female component and the male member of the male component being such that the male member can be entered into the socket axially thereof but to connect with said means laterally of the socket; the female component being formed with a resilient member and the male member of the male component with a recess into which, when the male member is entered into the socket, said resilient member engages to lock the male member in place; access to the recess being provided from said surface of the respective furniture member to provide access to the resilient member engaged therein from said surface of the respective furniture part so that a tool may be inserted to dislodge the resilient member from the recess and permit withdrawal of the male member from the socket.

Both the components may be formed of a plastics material and may be constituted by one-piece plastics mouldings.

The means of the male component for securing the component to the furniture part concerned may be in the form of a shank bearing ribs or threads passing in the circumferential direction thereof; the furniture part being bored with a suitable hole to receive the shank therein with a force fit so that the ribs or threads act to hold the shank in the bore. Similarly, the female component may be in the form of a body to fit within a bore formed in the respective furniture part, with the exterior of the body bearing ribs or threads passing in the circumferential direction and acting to hold the component in place in the bore.

The present invention will now be described, by way of example only, with reference to the accompanying drawing, in which.

Figure 1:
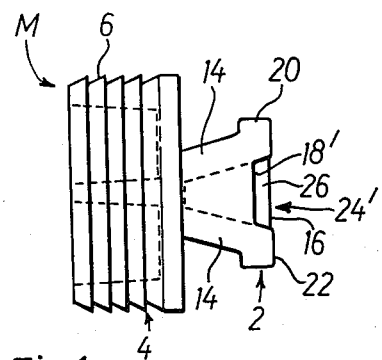
FIG. 1 is a plan view of one component of an embodiment of the invention.
Figure 2:
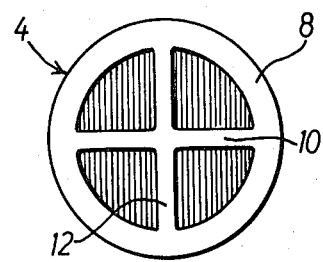
FIG. 2 is a rear elevation of the component of FIG. 1.
Figure 3:
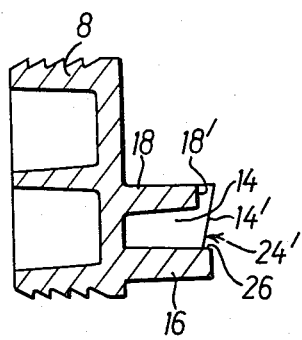
FIG. 3 is a section on the line A—A of FIG. 4.
Figure 4:
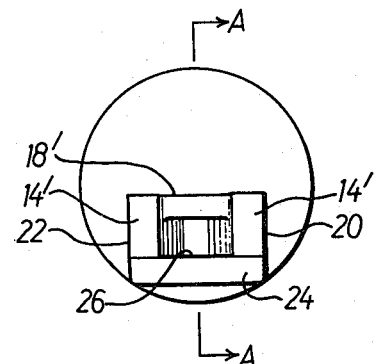
FIG. 4 is a front elevation of the component of FIG. 1.
Figure 5:
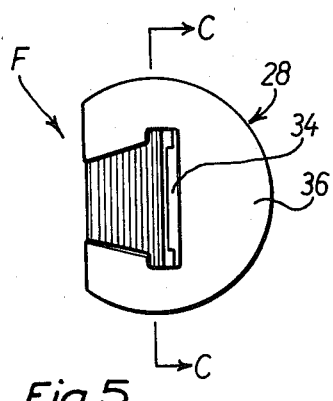
FIG. 5 is a plan view of a second component of the fitting of the emodiment.
Figure 6:
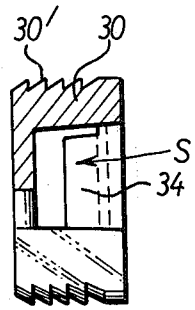
FIG. 6 is a half section on the line C of FIG. 5.
Figure 7:
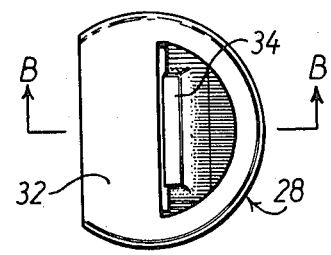
FIG. 7 is a plan view of the second component taken from an opposite aspect from that of FIG. 5.
Figure 8:
FIG. 8 is a side elevation of the second component.
Figure 9:
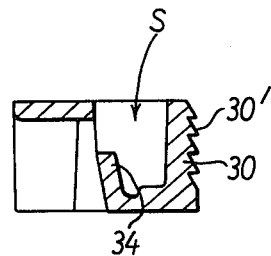
FIG. 9 is a section on the line B—B of FIG. 7.
Figure 10:
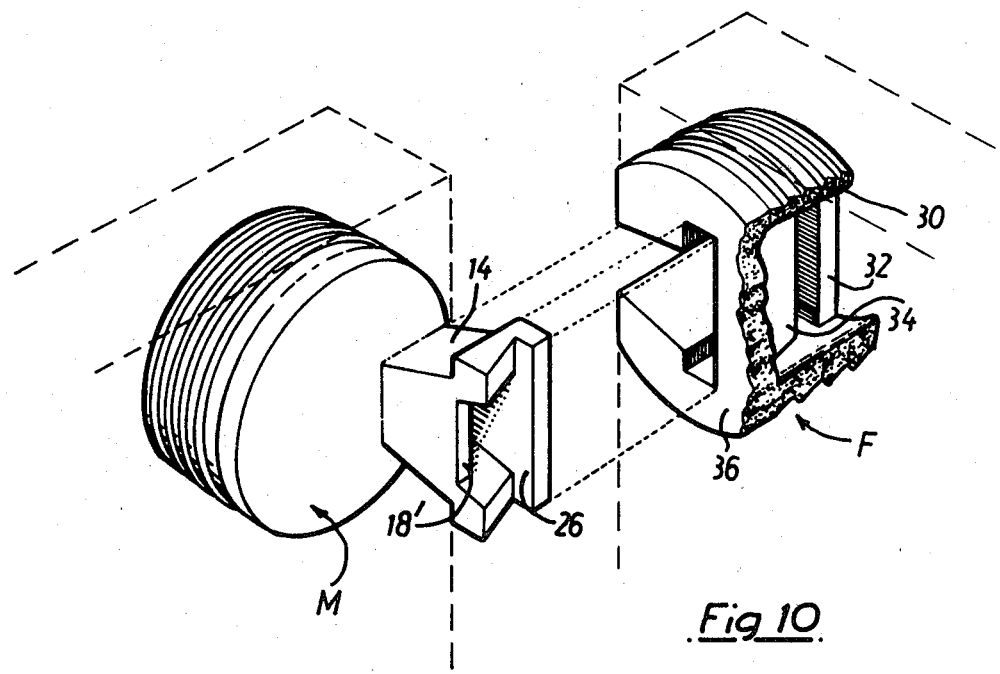
FIG. 10 is an exploded perspective view of the two components prior to assembly with the female component part broken away for clarity.

Referring to the drawings, the fitting consists of a male component M being the one shown in FIGS. 1 to 4, and a female component F shown in FIGS. 5 to 9.

The male component comprises a male member 2 and a shank 4 of cylindrical form and bearing ribs or threads 6 extending around the entire circumference thereof. The shank is formed by a cylindrical wall 8 the interior of which is divided by diametrical cross walls in this instance, walls 10,12 (FIG. 2) arranged normal to one another. This structure of the shank saves material while providing a shank of requisite strength.

The male member is hollow and comprises lateral walls 14, a wall 16 which may be regarded as a bottom wall, and a wall 18 which may be regarded as a top wall of the member 3. The lateral walls flare in the direction away from the shank and bear at their ends at the wider end of the member, outwardly and transversely directed flanges 20,22. The bottom wall bears an extension or flange 24 to form a general U-shape together with the flanges 20,22. The faces 14' of the latter are at the wider end of the member tapered in the direction from the top wall to the flange 24 to define with the flange 24 a ledge 26 passing across the entire width of the respective end of the male member as is most clearly indicated in FIG. 4. The facing inner aspects of the flanges 20,22 and the tapered faces 14' thereof along with the edge 18' of the top wall at said end of the member and the upper surface of the ledge 26 constitute the recess of the male component, the recess generally being indicated at 24'.

The female component comprises a part-cylindrical body 28 comprising body 28 comprising a lateral wall 30 formed on the exterior thereof with ribs or threads 30' extending around the circumference of the body. The body constitutes a socket S formed eccentrically of the axis of the body so that it interrupts a chordal side of the lateral wall 30 and, as a result, opens laterally of the body. The socket is bounded by the lateral wall 30, a first end wall 32 (FIG. 7) in this instance a partial end wall, formed at one end of the body, and an axially extending wall 34. The latter is integral with a second and partial end wall 36 formed at the opposite end of the body. The end wall 36 thus permits axial access to the socket. The axially extending wall is such that it is capable of resilient deflection transversely of the body, and may be regarded as forming a resilient member or tongue.

To explain the use of the fitting, it will be assumed that it is being used to join together a rear wall and an adjacent lateral wall of a cabinet with the vertical end face of one wall (assumed to be the lateral wall) in contact with the inner face of the other, rear, wall so that the vertical end face of the rear wall lies flush with the outer face of the lateral wall and so that the two walls lie at right angles to one another.

The lateral wall is bored with a hole, preferably a blind hole, into which the body of the female component may be fitted with a force fit; the ribs or threads of the body serving to hold the body in the hole against axial displacement therefrom. The location of the hole is such that it interrupts said vertical end face of the wall, whereby the hole assumes a part cylindrical form, so that, when the body of the female component is fitted therein, the body is entirely contained in the hole with the lateral opening in the socket of the body lying at the interruption in said end face of the lateral wall and flush with the end face. Thus, no part of the body projects from any of the surfaces of the furniture part concerned.

A hole, preferably a blind hole, is also bored in the rear wall likewise to take the shank of the male component with a force fit and to leave the male member projecting normally from the inner surface of the rear wall. The male member may then be axially entered into the socket of the female component. It may be noted that the socket is formed so that in section it is generally complementary in shape to that of the male member; the dimensions of the socket and male member being such that the male member is a tight fit in order to minimise play between the two components.

Further, the shape of the male member prevents lateral withdrawl of the member from the socket; and the provision of flanges 20,22 in particular ensure that the wall sections when joined by the fitting are brought closely into abutment.

The entry of the male member causes deflection of the resilient member 34 of the female component; and the latter is of a length such that when the male member is fully entered into the socket, the resilient member snaps into the recess 14 of the male component to seat on the ledge 26 and against the tapered faces of the lateral flanges of the male member to prevent withdrawal of the male member from the socket. In this position, the male member connects with the shank of the male component through the lateral opening of the socket and the interruption of said end face of the lateral wall; and the location of the hole in the rear wall is such that, when the two walls are joined by the fitting, the vertical end face concerned of the rear wall lies flush with the outer face of the lateral wall. Further, it may be noted that when the two parts are thus connected the recess of the male member is accessible from the exterior of the fitting.

Because the two components, when joined in the above described manner, are locked together and because they are very firmly anchored in their respective furniture parts, the latter are very securely held together; and because of the tight fit between the socket and male member, the fitting permits virtually no relative movement between the two furniture parts. In spite of this, the fitting components are easily and simply released from one another by inserting a suitable tool such as a screwdriver blade between the member 34 and the top wall of the male member to enter the recess to dislodge the resilient member from the recess of the male member.

Further the fitting of the embodiment may be simply and cheaply produced by moulding e.g. from nylon; the components each being produced as one-piece mouldings; and it is easy to fit, easy to use and, when fitted, is unobtrusive.

Although in the above described embodiment, each of ribs 6 and 30' is continuous, it will be understood that this need not be so, and that each rib could be intermittent.

I claim:

1. A furniture fitting for releasably securing together respective parts of a piece of furniture required to be held at a predetermined angular position in relation to one another, the fitting being one of two components, namely, a female component comprising a socket and means adapted to be let into a furniture part so that no portion of the component projects substantially from any of the surfaces of the furniture part and so that the socket is accessible from a surface thereof, and a male component having a male member and means adapted to be let into the other of the furniture parts to secure the male component to that part with the male member projecting from a surface thereof; the socket of the female component and the male member of the male component being such that the male member can be entered into the socket axially thereof but to connect with said means thereof laterally of the socket; the female component being formed with a resilient member and the male member of the male component with a recess into which, when the male member is entered into the socket, said resilient member engages to lock the male member in place; access to the recess being provided from said surface of the respective furniture member to provide access to the resilient member engaged therein from said surface of the respective furniture part so that a tool may be inserted to dislodge the resilient member from the recess and permit withdrawal of the male member from the socket.

2. A fitting according to claim 1, wherein each component is constituted by one-piece plastics moulding.

3. A fitting according to claim 1, wherein the means of the male component for securing the component to the furniture part concerned is in the form of a shank bearing at least one of ribs and threads extending around the circumference thereof, to be received in a suitable hole in the respective furniture part with a force fit so that at least one of said ribs and threads act to hold the shank in the bore.

4. A fitting according to claim 3, wherein the shank of the male component is of a whole cylindrical form.

5. A fitting according to claim 4, wherein the shank of the male component is hollow with internal reinforcing walls.

6. A fitting according to claim 5, wherein the reinforcing walls are crossed diametrical walls.

7. A fitting according to claim 6, wherein the diametrical walls are mutually perpendicular.

8. A fitting according to claim 1, wherein the male member comprises lateral surfaces flaring outwardly from said means of the male component.

9. A fitting according to claim 1, wherein the end of the male member remote from said means is formed so as to provide a ledge near the bottom edge of the remote end; said bottom edge being an edge of that surface of the male member which is entered first into the female member, the ledge correspondingly forming a bottom surface of said recess.

10. A fitting according to claim 9, wherein the male member is hollow and is constituted by four walls hereinafter referred to as lateral walls, a bottom wall and a top wall.

11. A fitting according to claim 10, wherein each of the lateral walls at the ends thereof remote from said means of the male member bears an outwardly and transversely directed flange, and the bottom wall bears a flange passing between those of the lateral walls, whereby the flanges form a general "U" shape; and wherein the faces of the flanges of the lateral walls at said end of the male member are tapered in the direction from the top wall of the male member towards the flange of the bottom wall so that together with the flange of the bottom wall, they form said ledge; the recess being constituted by the facing inner aspects of said lateral flanges, and said faces thereof and by the upper surface of the ledge and the edge of the top wall at said end of the male member.

12. A fitting according to claim 1, wherein the female component is in the form of a body to fit within a hole formed in the respective furniture part, with the exterior of the body bearing at least one of ribs and threads extending around the circumference thereof and acting to hold the component in place in the hole.

13. A fitting according to claim 12, wherein the body of the female component is in part cylindrical form.

14. A fitting according to claim 13, wherein the socket of the female member is disposed so as to interrupt the part cylindrical form at a chordal side thereof; the interruption hereinafter being called the front of the socket.

15. A fitting according to claim 14, wherein the body is a hollow form with the socket being bounded by oppositely disposed parts of the interrupted chordal side of the body, a rear wall section extending in the axial direction of the socket spaced from and generally parallel with the front of the socket, and an end wall connecting said oppositely disposed parts of the part cylindrical wall at the bottom end of the socket, that is, the end of the socket remote from that at which the male member is entered into the socket; said rear wall section being carried at the top end of the socket by a partial end wall covering the respective end of the body except for the top end of the socket and being resiliently deflectable transversely of the body and of a length such that, when the male member is entered fully into the socket, the free end of the rear wall section snaps into the recess of the male member to lock the male member in place, but so that the wall section can be displaced from the recess by entry of a tool therein, to release the male member.

16. A fitting according to claim 1, wherein each of the components is made of nylon.

17. A fitting according to claim 1, wherein the two components are formed such as to secure the respective furniture parts together substantially normally to one another.

* * * * *